Nov. 19, 1946.   K. C. ALWARD   2,411,240
SUPER TREAD FOR TIRES
Filed June 25, 1942
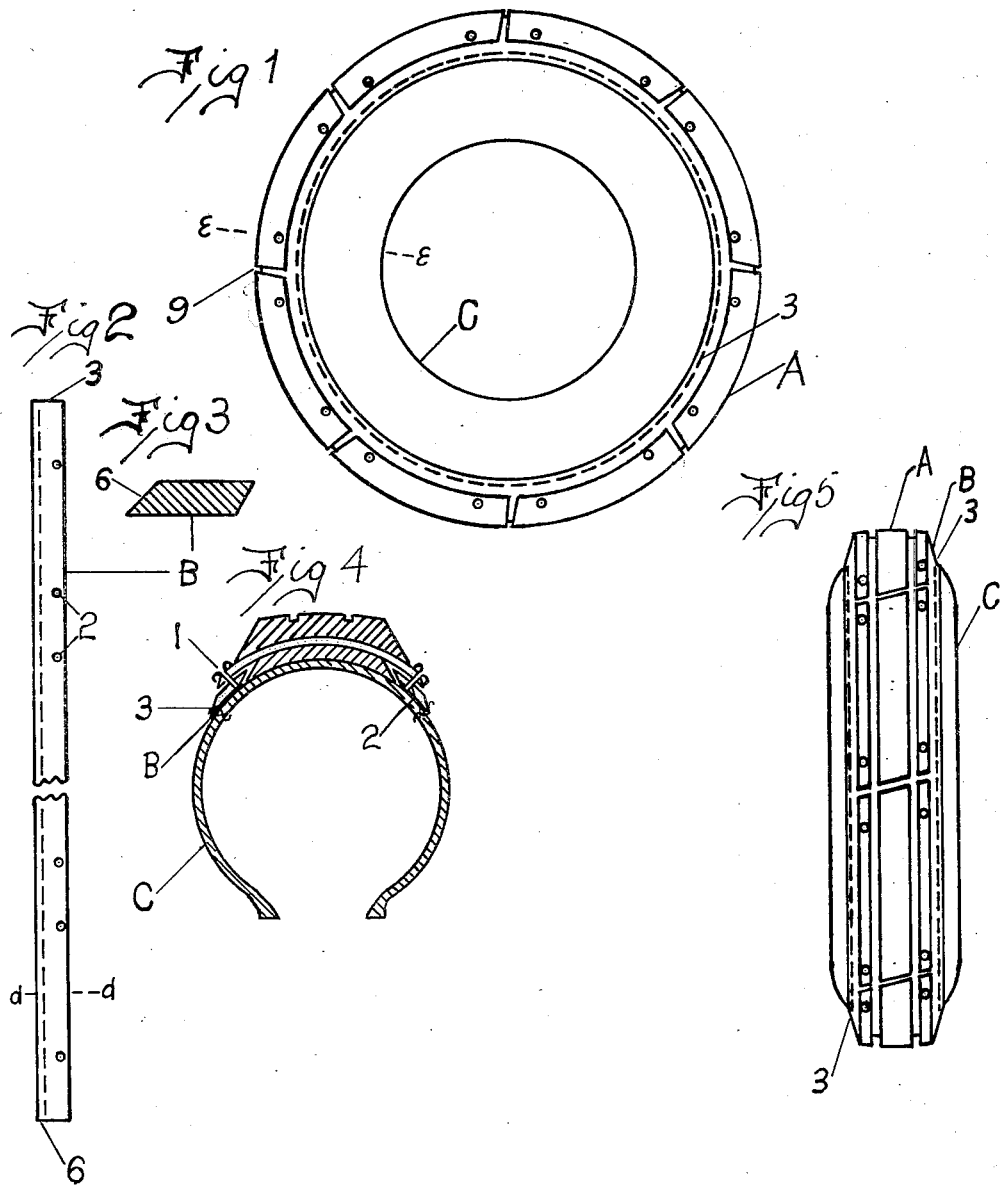
INVENTOR
Kenneth C. Alward Patented Nov. 19, 1946

2,411,240

UNITED STATES PATENT OFFICE 2,411,240

SUPERTREAD FOR TIRES

Kenneth Cutler Alward, Moweaqua, Ill.

Application June 25, 1942, Serial No. 448,367

2 Claims. (Cl. 152—191)

This invention relates to conveniently replaceable treads for tires. When pneumatic tires are arranged to utilize this invention at the time of their manufacture or later, renewed wearing surfaces or special traction tread members can be attached and/or detached by means of fasteners, etc.

The urgent need for such a satisfactory arrangement is attested by the fact that several mechanically renewable tread sole developments have been devised which were burdened by the use of metal strips and the like, which did not prove wholly satisfactory for one reason or another—especially in case of a puncture and consequent damage thereby.

In this invention such disadvantages are avoided by making the securing constructions entirely of flexible material, which is not likely to be subjected to irreparable damage, and therefore, a satisfactory renewable tread for tires is the result.

In the drawing:

Fig. 1 is a side elevational view of a pneumatic tire, combined with an improvised supertread in assembled association.

Fig. 2 is an elevational fragmented view of the tie band.

Fig. 3 is a cross sectional view of the tie band along line d—d of Fig. 2.

Fig. 4 is a view in cross section of a tire with tie band supertread at line e—e of Fig. 1.

Fig. 5 is an elevational view of a tire combined with improvised supertread.

Referring now to Figs. 1 and 5, it is seen by the gaps 9 that the sectional tread A, A, etc., is formed by a number of separate pieces, which could be made of leather, or fabric coated with Ameripol latex plastic, Thiokol, or "rubberless plastic." Or, the tread A can be made by shearing, beveling, and punching treads from otherwise unusable tires.

The sectional tread A is secured to the tire C by means of rivets 1 thru punched holes in the tread A and reinforced holes in the tie band B of Fig. 2. The tie band B is preferably fastened to the tire C by means of machine sewing with heavy thread as indicated by the interrupted lines 3 of Figs. 1, 2, 4, and 5 at the bevel 6 of the tie band B as shown in Figs. 2, 3, and 4.

For purposes of strength, the rivet holes of the permanent tie band B are reinforced with metal eyelets 2, which need not be provided in the corresponding holes of the sectional tread A (unless screws and lock washers are used), which tread (A) can be replaced with a new one when worn out.

It is recommended that the reinforced holes of the tie band be given a standardized spacing, so that the holes in replacement supertreads can be given the same standardized spacing.

The tie band B can best be made of leather, similar to small flat leather belting material, or can be made from strips of the side walls of tires.

When replacement of the tread is necessary, the crimps of the rivet 1 are ground off, releasing the outworn tread. It is possible that flat headed machine screws, equipped with star lock washers could be screwed into threaded holes of the eyelet 2 for more convenient replacement.

Changes or additions made in the structures, within the scope of this invention, are included in its legal boundaries.

I claim:

1. In combination with a pneumatic tire a conveniently attachable tread therefor comprising a plurality of sectional, resilient tread soles encompassing the perimeter of said tire, and comprising a circular tie band having beveled inner and outer edges so as to acquire a relatively unabrupt surface between said tire and said attachable tread therefor, means for attaching the tie band to the foundation tire, means fastening the tread member to the tie band in a manner such that the tread overlaps the tie band, which provides an anchoring member holding said attachable tread.

2. Incorporated in an arrangement for providing mechanically replaceable wearing surface members in cooperation with resilient tires superstructures imposed upon said inflated tires, tie bands comprising flexible binding strips formed in a concentric manner and fixedly secured flatly adjacent relative to the sidewalls of said tires, said anchoring tie bands comprising holes for facilitating attachment fastening in cooperation with corresponding holes in imposed attachable tire treads, a cojoining fastening device thru said holes, the tie band thus maintaining, as a result of joining and tire inflation, conjunctive assembly between said resilient tire and said tread superstructures.

KENNETH CUTLER ALWARD.